UNITED STATES PATENT OFFICE.

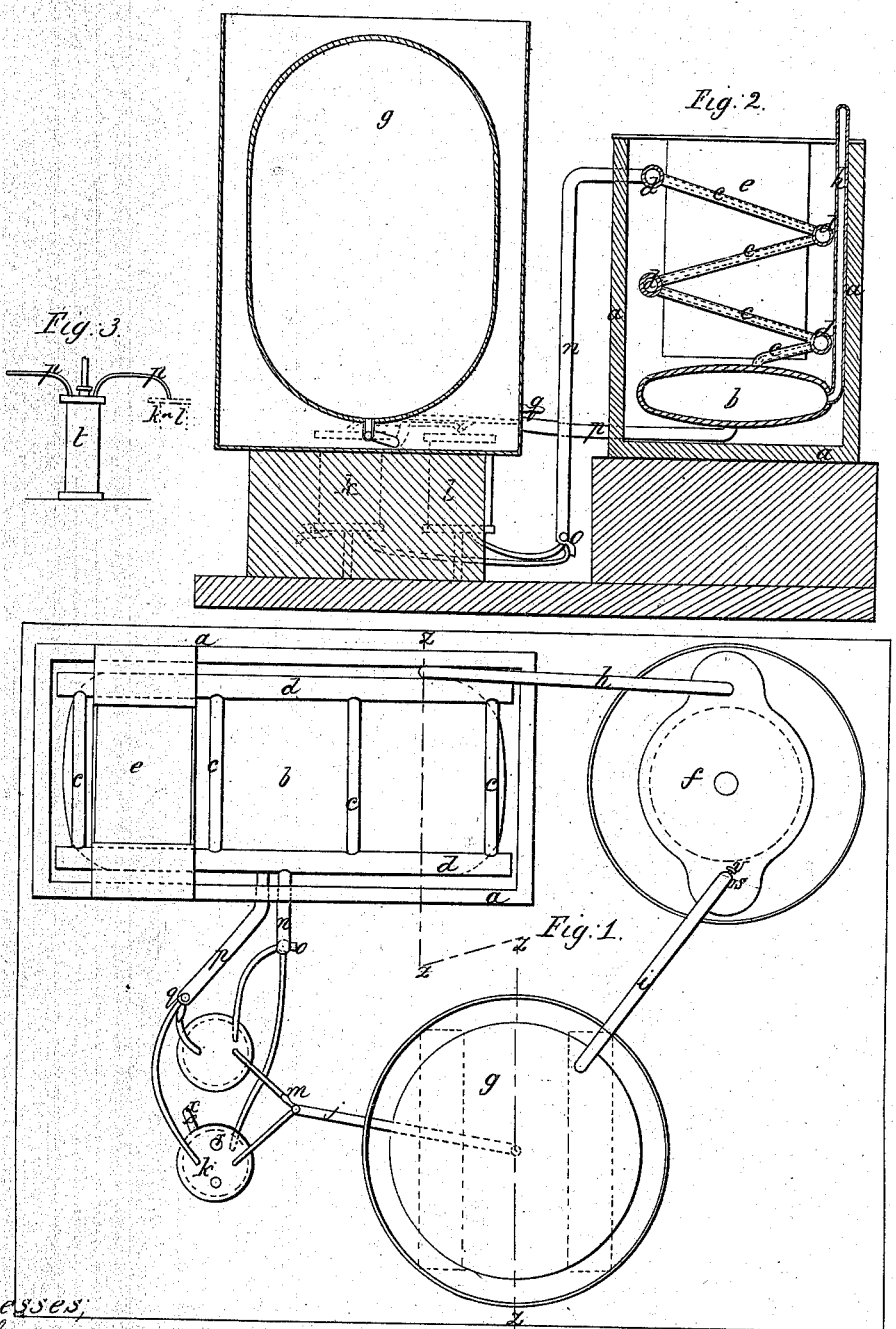

ADOLPHE ROCK, OF BOSTON, MASSACHUSETTS.

IMPROVEMENT IN ICE-MACHINES.

Specification forming part of Letters Patent No. 112,284, dated February 28, 1871.

*To all whom it may concern:*

Be it known that I, ADOLPHE ROCK, of Boston, in the county of Suffolk and State of Massachusetts, have invented certain new and useful Improvements in Process and Apparatus for Cooling and Freezing either Solid, Liquid, or Gaseous Bodies; and do hereby declare the following to be a full, clear, and exact description thereof, reference being had to the accompanying drawings, and to the letters of reference marked thereon.

The nature of my invention consists, first, in the employment of a copious uninterrupted stream of volatile liquid used to produce cold by its evaporation, circulating partly in the form of air and partly in liquid state within the apparatus from the evaporating to the condensing vessels, and vice versa; second, in the employment of two or more vessels called "chargers" interposed between the condensing and evaporating parts of the apparatus, or one or two of such vessels with an additional pump in combination therewith; third, in the construction of the evaporative or vacuum chambers, whereby an increase of evaporative surface is gained, distribution of the frigorific effect throughout the liquid to be cooled is equalized, frigorific effect is produced in close proximity with the bodies intended to freeze, and its whole power utilized by total immersion of these vaporative chambers in liquid which I call freezing medium; and, fourth, in rendering the said apparatus automatic in its operation by means of the above-mentioned pump, working in combination with one or more chargers, all of which will be hereinafter fully described.

In order to enable others skilled in the art to which my invention appertains to make and use the same, I will now proceed to describe my process and apparatus and its operation, referring to the annexed drawings, which form a part of this specification, and in which—

Figure 1 is a plan view of my apparatus. Fig. 2 is a section of the same taken on the line *z z*, Fig. 1; and Fig. 3 is a detail view of the secondary pump which may be substituted for one of the chargers.

*a* represents the tank in which are placed the evaporation-chambers *b c d*, made of metallic tubing. These chambers consist of a series of horizontal tubes, *d*, connected by another series of oblique tubes, *c*. The tubes *c* I prefer to make flattened in order to gain surface. They are slightly inclined from the horizontal line, in order to cause the volatile liquid when vaporizing within to flow down by its own gravity; but the inclination is slight, in order that the liquid may have time to vaporize to a certain extent before it reaches the bottom.

The tank *a* is filled with a solution of glycerine and alcohol, or solution of potash, or of tartrate of soda, or any other liquid which will not congeal at the temperature necessary for the congelation of water, thus serving as a vehicle for the frigorific effect to the water intended to be converted into ice, such water being held in a vessel, *e*, of any suitable shape and set between the oblique tubes *c* into the solution, and within the tank *a*, as shown in Fig. 1.

A tube, *h*, connected at one end with the vacuum-chambers *b c d*, as shown in Fig. 2, communicates at its other end with the suction-channel of a common double-acting suction and force pump, *f*, whereby the vapor generated in the vaporizing-chambers is withdrawn and is forced through the pipe *i* into the condenser *g*, where under pressure it liquefies. This condenser, as well as the pump *f*, is surrounded by jackets kept full of water, either standing or running, to carry off the caloric generated by compression, and abstracted from water in the vessels *e*. The vapor being liquefied in the condenser runs through the pipe *j* into the charger *k* or *l*.

These chargers *k* and *l* are made of glass cylinders with metallic heads, or of metal with a glass window, so that the height of the liquid within may be plainly seen and controlled by the operator. One or both of these chargers are provided with removable caps *r*. The pipe *j* being branched, as shown, connects both of the chargers with the condenser *g*, and is provided with a common two-way stop-cock or valve, *m*, arranged so that when one of the chargers communicates with the condenser the other is shut off.

Both chargers are placed on a level below the bottom of the condenser, so that liquid running from thence may fill them entirely.

The chargers have at the bottom a second branching tube, n, provided with a stop-cock, o, and communicating with the uppermost vaporization-tube d; also, a third branching tube, p, with stop-cock q, connecting the top of the chargers with the bottom of the lowest vaporization-chamber b.

The operation of my apparatus is as follows: The tank a is filled with an uncongealable solution; the vessels e, filled with water to be converted into ice, are set in; the condenser g disconnected from the pump f by the stop-cock s, and the tap v opened. It is evident, now, that by working the pump the air will be drawn from within the apparatus and discharged through the said tap v. When a sufficient vacuum is made, one of the chargers—for instance, k—is disconnected, by the manipulation of the stop-cocks m o q, (o and q being of the same kind as m,) from the rest of the apparatus. The tap r is opened, and the charger completely filled with the volatile liquid desired to be used. Thus the apparatus is charged with liquid for vaporization without any possibility of admitting any air within, and when the tap v is closed, and the stop-cock s opened, the apparatus is ready to operate.

The stop-cocks q, o, and m are turned so as to connect the empty charger l with the chamber b, and disconnect the same from the condenser g and the tube n. By the same manipulation the full charger k will be connected with the condenser g and the tube n, and disconnected from the vacuum-chamber b. The following operation then becomes self-evident:

As soon as the stop-cock o is opened, the volatile liquid, by its own expansive force, will rush through the pipe n into the upper evaporative tube d, thence distributing along the flat tubes c c to the next tube d, and so on, until it finally reaches the bottom reservoir b. In the meantime, the pump f being worked, the vapor is drawn from the vacuum-chambers b c d as fast as it generates, and forced into the condenser, where it is liquefied and returns through the pipe j to the same charger from whence it started. At the beginning of the operation the liquid boils very violently; but after a few minutes' working, when the temperature of the solution or freezing medium surrounding the vaporizing-chambers is lowered, the boiling is lessened, and consequently the liquid in the tubes c and d reaches the bottom chamber or reservoir b before it is wholly evaporated. Then this unevaporated liquid runs along the tube p, into the empty charger l, where it remains and accumulates until the charger k is emptied. Then, by manipulation of the stop-cocks m o q, the action is reversed. The emptied charger k becomes in its turn the receptacle for the liquid returning unevaporated, and the charger l supplying it to the top of the vaporizing-chambers, it being always the pressure of condensation that drives the liquid up the tube n. This tube n may be provided, if desired, with an additional stop-cock at any point between the stop-cock o and tube d, and provided with a graduated scale, in order to lessen or augment the flow of liquid into the evaporator with the greatest precision.

The chargers k and l, being made larger than necessary to freeze a given bulk of water, gives chance to have on hand a plentiful supply of cooling-liquid without encumbering with it the parts of the machine actually working, such as the condenser or evaporation tubes; and even in case of the necessity of replenishing or withdrawing some of the liquid, this may be done without interfering with the working of the apparatus, simply by the manipulation of the stop-cocks m o q, as shown above, without any loss of vapor or liquid, or admitting any air within.

One or both of these chargers may have a scale cut on the glass, or attached to it, showing, according to the height of the liquid, its volume in gallons, pints, gills, &c., or in pounds, ounces, &c., or in both, for the convenience of the operator, and for the better regulating and governing the speed of the whole process.

In Fig. 3 I have represented a pump similar to the one marked f, but of much smaller dimensions. This is to be used in lieu of one of the chargers. In such case this smaller pump is connected by its suction-channel to the bottom of the chamber b, and its forcing-channel communicating with the charger at the top, like the pipe p. The charger should then have a single pipe, provided with a one-way stop-cock to communicate with the condenser, and another similar pipe at its bottom to communicate with the upper evaporative chamber d. In operation, this small pump, being constantly worked, would draw the unevaporated liquid from the chamber b, and force it against pressure into the charger. In this manner the charger can never empty itself, because, when the liquid evaporated within the chambers b c d returns in liquefied state to the charger through the condenser g, the part not evaporated returns to the same through the pump, Fig. 3, and hence the apparatus charges and discharges itself without any attendance.

The stop-cock s and tap v (shown in the pump f) may then be more conveniently placed in the same relative position in this smaller pump.

For the purpose of repairs or any changes, the whole of the liquid and vapor may be forced into one charger, and then disconnected from other parts of the apparatus, thus preventing the loss of vapor and liquid.

This is accomplished as follows: The pump f remains inactive. The charger into which the liquid and vapor are to be forced is disconnected from both condenser and vacuum vessels, as is done for primarily charging the machine; then, by the same manipulation as is above explained, a communication between these vessels through the other charger is established. Now, by working the pump, Fig. 3, the whole of the liquid and vapor from all the parts of the machine will be forced into and condensed in the first charger.

When only one charger is employed, a tube communicating at one end with the pipe $j$, at any point between the stop-cock $m$ and condenser, and at the other end with the pipe $n$, at any point between the stop-cock $o$ and evaporative chambers, will answer the same purpose, this additional pipe being provided with a valve in order to intercept the said communication when not needed. The stop-cock shown at the bottom of the charger $k$ in Fig. 1 serves to withdraw the liquid from the charger when necessary.

Any volatile liquid, such as naphtha, benzine, rigolene, sulphuric ether, and many others, may be used in my machine.

This process and apparatus possesses a great many advantages over those heretofore used for the same purpose, some of which advantages I will here briefly mention.

By the total immersion of the evaporation-chambers in a freezing medium, no surface is exposed to the temperature of the surrounding atmosphere, and thus the whole frigorific power produced is utilized.

Maintaining a copious uninterrupted stream of cooling-liquid within the evaporative-tubes, the liquid presents at every moment another particle to the surface, and thus vaporization is augmented, and the heat-absorbing capacity of the liquid, as well as of the vapor, is utilized, both being constantly removed to the condenser to be deprived of heat by compression; and, besides, when naphtha, benzine, gasoline, or other similar liquids are used, these liquids will leave behind some heavier oily deposits. These deposits cannot clog my apparatus, because the said stream will wash them down to one of the chargers, from whence they may be easily removed, if needed. Thus the purification or separation of some of these liquids may be accomplished, as well as production of ice.

The arrangement of vaporizing-tubes is such that when a vessel, $e$, freshly filled with water, is set into the freezing medium, the pressure of heat therein, being greater than in the other vessels of the same kind, evaporation within the adjoining tubes will be greater. Then the liquid in the horizontal tubes $d$ will, by its own gravity, supply and equalize its distribution into the tubes $c$, according to the amount evaporated.

And these horizontal tubes, being also connected with the suction-pipe $h$, equalize the withdrawal of the vapor also, and at the same time. The suction thus creates a draft in the direction opposite to the current of liquid among the tubes $c$ and $d$, which greatly facilitates the evaporation.

I am aware that apparatus have been constructed for converting water into ice by the evaporation of volatile liquids; hence I do not wish to be understood as claiming such process as my invention; neither do I desire to claim the exclusive use of any particular liquid for this purpose; but What I do claim as new, and desire to secure by Letters Patent, is—

1. In an apparatus for cooling and freezing liquids, the employment of two or more chargers interposed between and connected with the condensing and evaporating parts of the apparatus, substantially as and for the purposes herein set forth.

2. The combination, in an apparatus for cooling and freezing liquids, of one or more chargers, and the pump, Fig. 3, interposed between and connected with the condensing and evaporating parts of the apparatus, for the purpose of rendering said apparatus automatic in its operation, substantially as set forth.

ADOLPHE ROCK.

Witnesses:
 J. B. CROSBY,
 FRANCIS GOULD.